US009299205B2

(12) United States Patent
Kameyama et al.

(10) Patent No.: US 9,299,205 B2
(45) Date of Patent: Mar. 29, 2016

(54) KEYLESS ENTRY SYSTEM

(71) Applicants: DENSO CORPORATION, Kariya, Aichi-pref. (JP); Tomoyuki Funayama, Toyota-shi, Aichi-ken (JP); Shoji Kakinuma, Toyota-shi, Aichi-ken (JP)

(72) Inventors: Yuuto Kameyama, Chiryu (JP); Tomoyuki Funayama, Toyota (JP); Shoji Kakinuma, Okazaki (JP)

(73) Assignees: DENSO CORPORATION, Kariya, Aichi-pref (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/391,298

(22) PCT Filed: Apr. 10, 2013

(86) PCT No.: PCT/JP2013/002433
§ 371 (c)(1),
(2) Date: Oct. 8, 2014

(87) PCT Pub. No.: WO2013/153805
PCT Pub. Date: Oct. 17, 2013

(65) Prior Publication Data
US 2015/0070136 A1 Mar. 12, 2015

(30) Foreign Application Priority Data
Apr. 11, 2012 (JP) ................................. 2012-090203

(51) Int. Cl.
G07C 9/00 (2006.01)
B60R 25/20 (2013.01)

(52) U.S. Cl.
CPC ............ *G07C 9/00309* (2013.01); *B60R 25/20* (2013.01); *G07C 9/00* (2013.01)

(58) Field of Classification Search
CPC .............................. G07C 9/00; G07C 9/00309
USPC ............................... 340/5.71–5.74, 5.61, 5.64
See application file for complete search history.

(56) References Cited

U.S. PATENT DOCUMENTS

| 6,906,612 B2 | 6/2005 | Ghabra et al. |
| 8,717,142 B2 | 5/2014 | Nagao et al. |

(Continued)

FOREIGN PATENT DOCUMENTS

| JP | 2003148019 A | 5/2003 |
| JP | 2005521299 A | 7/2005 |

(Continued)

OTHER PUBLICATIONS

International Search Report and Written Opinion (in Japanese with English Translation) for PCT/JP2013/002433, mailed Jun. 11, 2013; ISA/JP.
Extended European Search Report dated Nov. 15, 2015 in the corresponding EP Application No. 13776068.2.
U.S. Appl. No. 14/751,534, filed Jun. 26, 2015, Funayama.
Office Action dated Nov. 19, 2015 in the related U.S. Appl. No. 14/751,534.

*Primary Examiner* — Allen T Cao
(74) *Attorney, Agent, or Firm* — Harness, Dickey & Pierce, P.L.C.

(57) ABSTRACT

A keyless entry system including multiple portable devices and an in-vehicle device controlling smart lock and smart unlock of a vehicle door is disclosed. The in-vehicle device includes an vehicle-cabin-inside portable determination section, which when locking the vehicle door by the auto-lock function, determines whether or not there is the portable device located inside the vehicle cabin, and a disabled state release section that releases the disabled states of all of the portable devices when the vehicle-cabin-inside portable determination section determines that there is no portable device located inside the vehicle cabin.

4 Claims, 3 Drawing Sheets

(56) References Cited

U.S. PATENT DOCUMENTS

| | | |
|---|---|---|
| 2003/0014164 A1 | 1/2003 | Shin |
| 2004/0203630 A1 | 10/2004 | Wang |
| 2005/0151630 A1* | 7/2005 | Shimonomoto .... B60R 25/1004 340/426.14 |
| 2007/0120645 A1 | 5/2007 | Nakashima |
| 2008/0114539 A1 | 5/2008 | Lim |
| 2009/0096578 A1 | 4/2009 | Ogino et al. |
| 2010/0050713 A1 | 3/2010 | Nagao et al. |
| 2010/0073153 A1 | 3/2010 | Yamaguchi et al. |
| 2011/0202201 A1* | 8/2011 | Matsubara .............. B60R 25/00 701/2 |
| 2012/0182122 A1* | 7/2012 | Nishiguchi ......... H04W 52/283 340/5.61 |
| 2013/0222111 A1* | 8/2013 | Inoue ...................... G05B 1/01 340/5.65 |

FOREIGN PATENT DOCUMENTS

| | | |
|---|---|---|
| JP | 2007107344 A | 4/2007 |
| JP | 2008125087 A | 5/2008 |
| JP | 2010-077666 A | 4/2010 |
| JP | 2010077665 A | 4/2010 |
| JP | 2010077887 A | 4/2010 |
| JP | 4488050 B2 | 6/2010 |
| JP | 2011247076 A | 12/2011 |
| JP | 2012-102585 A | 5/2012 |
| WO | 2014/125650 A1 | 8/2014 |

* cited by examiner

IN-CABIN COLLATE-AREA

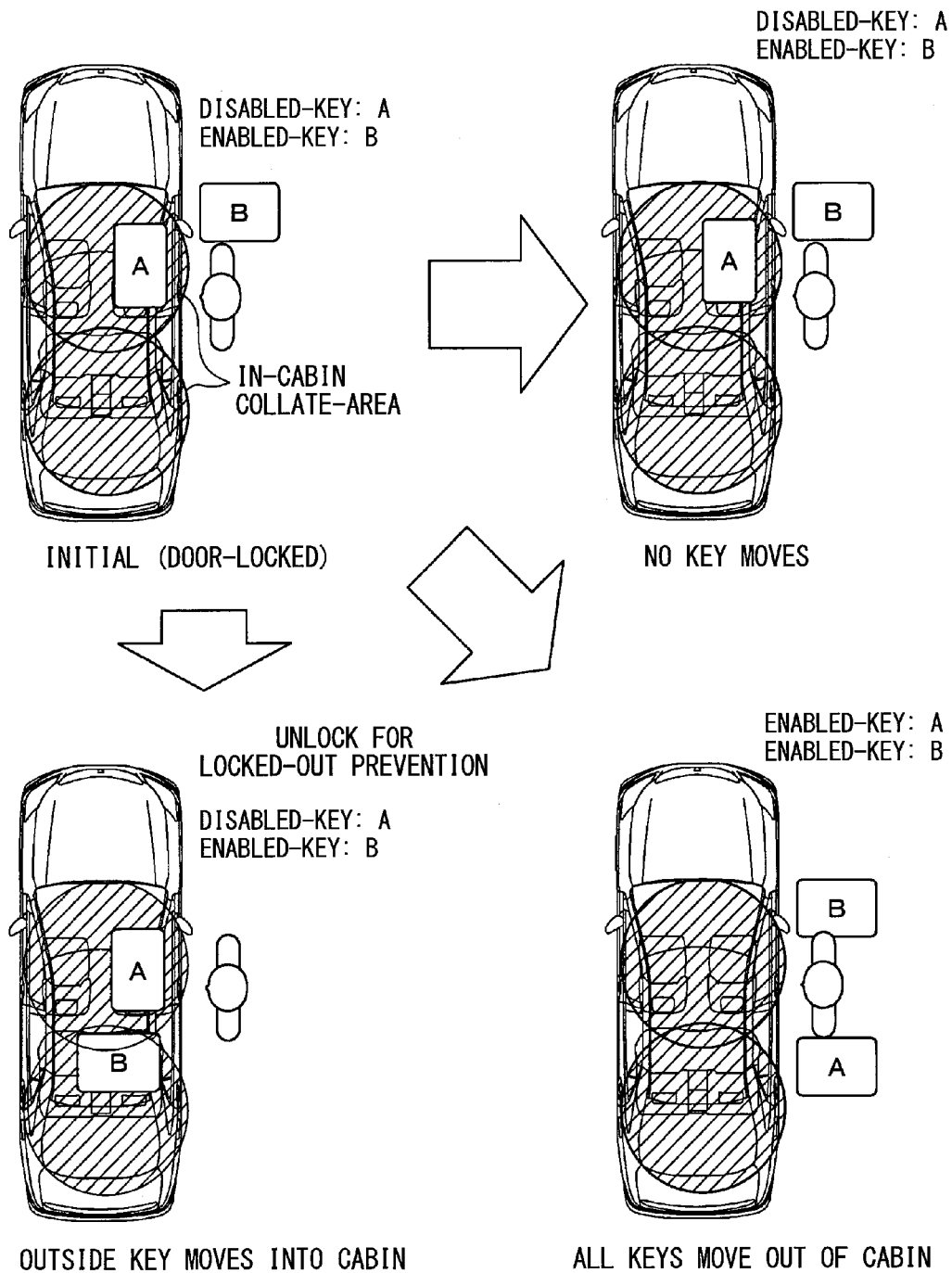

KEYLESS ENTRY SYSTEM

CROSS-REFERENCE TO RELATED APPLICATIONS

This application is a U.S. National Phase Application under 35 U.S.C. 371 of International Application No. PCT/JP2013/002433 filed on Apr. 10, 2013 and published in Japanese as WO 2013/153805 A1 on Oct. 17, 2013. This application is based on and claims the benefit of priority from Japanese Patent Application No. 2012-090203 filed on Apr. 11, 2012. The entire disclosures of all of the above applications are incorporated herein by reference.

FIELD OF THE INVENTION

The present disclosure relates to a keyless entry system (also translated as smart key system) including multiple portable devices and an in-vehicle device performing control of smart lock and smart unlock of a vehicle door.

BACKGROUND ART

A smart entry system (also translated as smart key system) has been put in practical use. In the system, the portable device carried by a user is collated with an in-vehicle device mounted in a vehicle, so that a user with an authorized portable device can startup and stop an engine by pressing a starter switch and the user can lock and unlock a vehicle door by touching a vehicle door switch.

In such a smart entry system, if the user leaves the portable device in a vehicle cabin and radio wave of this portable device leaking out of a vehicle cabin causes the smart unlock of the vehicle door, a stranger may become able to enter the vehicle cabin.

To address the above, a system collates a portable device after disabling the portable device left in the vehicle cabin. If the collation of a different portable device is successful, the system performs the smart unlock of the vehicle door, and thereafter, in response to the startup of the engine by the different portable device, the portable device left in the vehicle cabin is enabled (see for example patent document 1).

RELATED ART DOCUMENT

Patent Document

Patent Document 1: JP-A-2010-77887

SUMMARY OF INVENTION

In order to prevent forgetting of lock of the vehicle door, some smart entry systems are provided with an auto-lock function, which automatically locks the vehicle door if an opening and closing of the vehicle door has not been detected during a predetermined time (e.g., 30 seconds) after the smart unlock of the vehicle door was performed.

It may be preferable that the smart entry system with the auto-lock function be configured in such way that if the portable device is left in the vehicle cabin, the system disables this portable device and collates a portable device, as the system described in Patent Document 1 does.

However, such a smart entry system with the auto-lock function may involve, for example, the following situation. Even when the portable device is carried to an outside of the vehicle cabin before the elapse of the predetermined time from the smart unlock of the vehicle door, if a door courtesy switch for detecting a door open of the vehicle door has a failure and fails to detect the door open of the vehicle door, the auto-lock function automatically locks the vehicle door upon the elapse of the predetermined time from the smart unlock of the vehicle door Therefore, if the smart entry system with the auto-lock function is provided with the function of disabling a portable device left in the vehicle cabin and the function of collating a portable device, the system may involve the following difficulty. If an vehicle door open detection switch such a door courtesy switch or the like has a failure and does not detect the door open of the vehicle door, the portable device left in the vehicle cabin may be maintained at the disabled state when it is carried to the outside of the vehicle cabin, and the auto-lock function may automatically lock the vehicle door. In this case, when a user tries to ride in the vehicle next time, the smart unlock of a vehicle door is unavailable.

The present disclosure is made in view of the foregoing and has an object to provide a keyless entry system that can prevent unavailability of smart unlock of a vehicle door in case of a failure of a vehicle door open detection switch.

A keyless entry system according to an example of the present disclosure includes a plurality of portable devices and an in-vehicle device. The in-vehicle device controls smart lock and smart unlock of a vehicle door and includes a vehicle-cabin-inside portable determination section and a disabled state release section. The in-vehicle device has the following function; when the smart unlock of the vehicle door is to be performed, the in-vehicle device performs a vehicle-cabin-outside collation, which is collation of a portable device located outside a vehicle cabin while excluding a portable device in a disabled state, wherein the portable device located inside the vehicle cabin is placed in the disabled state. In accordance with a result of the vehicle-cabin-outside collation, the in-vehicle device performs the smart unlock of the vehicle door. The in-vehicle device further has the following auto-lock function; after performing the smart unlock of the vehicle door, the in-vehicle device keeps the vehicle door unlocked when an open state of the vehicle door is detected with a vehicle door open detection switch and automatically locks the vehicle door upon elapse of a predetermined period when opening and closing of the vehicle door have not been detected during the predetermined period. When locking the vehicle door by the auto-lock function, the vehicle-cabin-inside portable determination section determines whether or not there is the portable device located inside the vehicle cabin. When the vehicle-cabin-inside portable determination section determines that there is no portable device located inside the vehicle cabin, the disabled state release section releases the disabled states of all of the portable devices.

According to the above configuration, when the lock of the vehicle door by the auto lock function is performed, it is determined whether or not there is a portable device inside the vehicle cabin. When it is determined that there is no portable device inside the vehicle cabin, the disabled-states of all of the portable devices are released. Therefore, it becomes possible to prevent the following situation, in which the smart unlock of the vehicle door is unavailable when the vehicle door opening detection switch fails.

BRIEF DESCRIPTION OF THE DRAWINGS

The above and other purpose, feature, and advantage of the present disclosure will become more apparent from the below detailed description made with reference to the accompanying drawings. In the drawings:

FIG. 4 is a diagram for explanation on changes in position and state of a portable device "A" and a portable device "B" for a vehicle.

DESCRIPTION OF EMBODIMENTS

Figure 1:
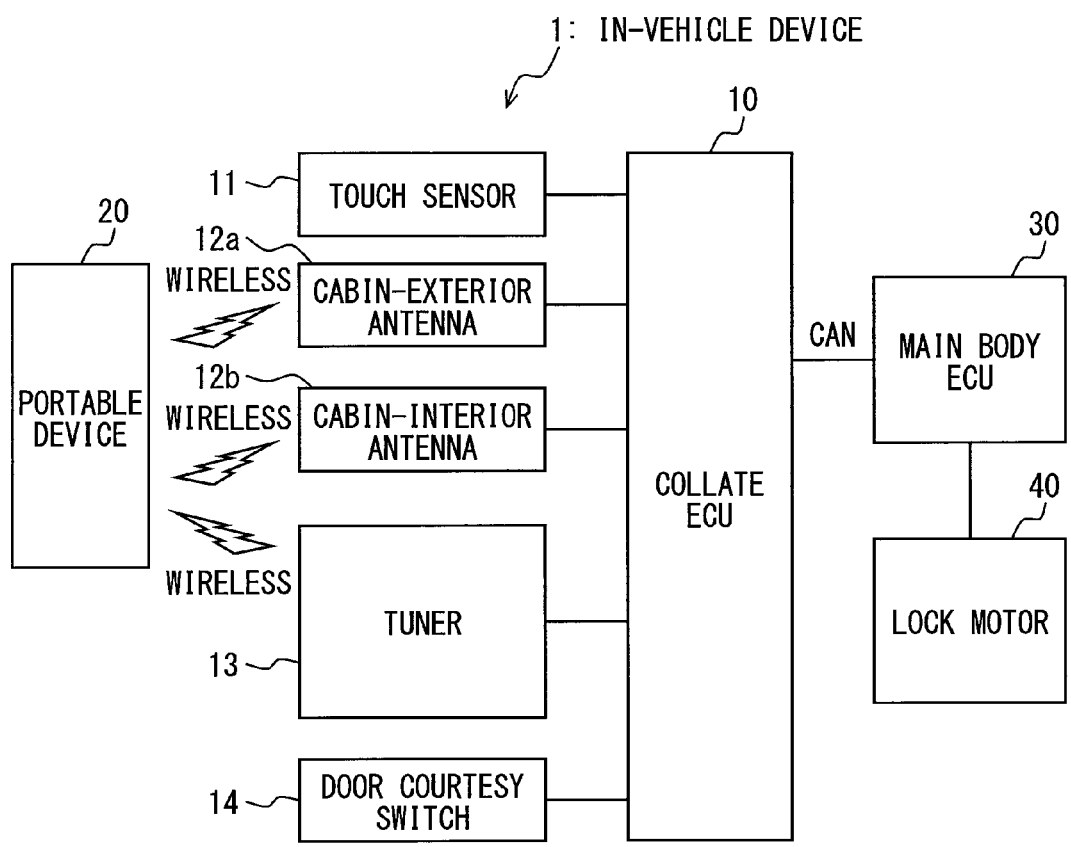
FIG. 1 is a diagram illustrating a configuration of a keyless entry system of an embodiment.

FIG. 1 illustrates a configuration of a keyless entry system according to an embodiment of the present disclosure. In the keyless entry system, a vehicle-cabin-outside antenna 12a and a vehicle-cabin-inside antenna 12b mounted to parts of the vehicle transmit radio waves for collating a portable device 20 used as an electronic key. In response to the radio wave, the portable device 20 transmits a response data. The keyless entry system makes a determination as to receipt of the response data to collate the portable device 20. In accordance with a result of the collation, the keyless entry system performs the smart lock and the smart unlock of the vehicle door. In the present embodiment, the lock of the vehicle door in accordance with a result of the collation is referred to as the smart lock, and the unlock of the vehicle door in accordance with a result of the collation is referred to as the smart unlock, in order to distinguish the smart lock and the smart unlock from the locking and unlocking of the vehicle door by a key structure of the portable device 20.

The keyless entry system includes an in-vehicle device 1, portable devices 20, a main body electronic control unit (ECU) 30, and a lock motor 40. The in-vehicle device 1 includes a collation ECU 10, a touch sensor 11, a vehicle-cabin-outside antenna 12a, an vehicle-cabin-inside antenna 12b, a tuner 13 and a door courtesy switch 14. In FIG. 1, a 1 portable device 20 is depicted.

The touch sensor 11 is disposed proximity to a doorknob of the vehicle door to detect an operation for the smart lock and the smart unlock of the vehicle door. A signal in accordance with a user's touch operation is outputted from the touch sensor 11 to the collation ECU 10.

The vehicle-cabin-outside antenna 12a transmits the radio wave for vehicle-cabin-outside collation (collation of the portable device 20 located outside the vehicle cabin). In the present embodiment, five vehicle-cabin-outside antennas 12a are equipped to the vehicle, so that the five vehicle-cabin-outside antennas 12a, respectively, correspond to a driver's seat, a front passenger seat, a driver side rear seat, a front passenger side rear seat, and a rear door or a trunk.

Figure 2:
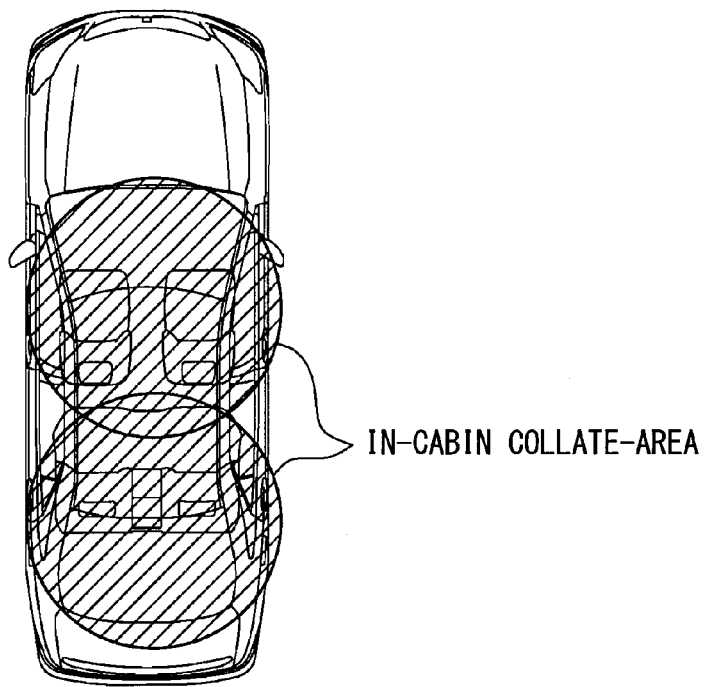
FIG. 2 is a diagram illustrating a vehicle-cabin-inside collation.

The vehicle-cabin-inside antenna 12b transmits the radio wave for vehicle-cabin-inside collation (collation of the portable device 20 located inside the vehicle cabin). Specifically, the vehicle-cabin-inside antenna 12b transmits the radio wave for collation of the portable device 20 located in a vehicle-cabin-inside collation area, as illustrated in FIG. 2.

The tuner 13 is a device for receiving a response data, which is sent as a response from the portable device 20. A reception signal representing the response data is inputted from the tuner 13 to the collation ECU 10.

The door courtesy switch 14 detects the opening and closing of the vehicle door. A signal in accordance with opening/closing states of the vehicle door is inputted from the door courtesy switch 14 to the collation ECU 10.

The collation ECU 10 includes a microcomputer with a CPU, a RAM, a ROM, an EEPROM, an I/O and the like. The CPU performs various processes by executing programs stored in the ROM.

Processes of the collation ECU 10 include a vehicle-cabin-outside collation, a vehicle-cabin-inside collation, a smart lock control, and the like. In the vehicle-cabin-outside collation, the radio wave for collation is transmitted from the vehicle-cabin-outside antenna 12a to an outside of the vehicle cabin, and the radio wave transmitted from the portable device 20 in response to this radio wave is received and collated to detect the portable device 20 located outside the vehicle cabin. In the vehicle-cabin-inside collation, the radio wave for collation is transmitted from the vehicle-cabin-inside antenna 12b to an inside of the vehicle cabin, and the radio wave transmitted from the portable device 20 in response to this radio wave is received and collated to detect the portable device 20 located inside the vehicle cabin. In the smart control, instructions on the smart lock of or the smart unlock of the vehicle door is issued to the main body ECU 30 in accordance with a collation result of each collation.

The collation ECU 10 and the main body ECU30 are connected via a vehicle LAN (CAN).

The main body ECU30 includes a microcomputer with a CPU, a RAM, a ROM, an EEPROM, an I/O and the like. The CPU performs various processes by executing programs stored in the ROM.

The main body ECU 30 controls a lock motor 40 provided to each vehicle door of the vehicle, thereby performing smart lock control and smart unlock control of the vehicle.

The portable device 20 is assigned a unique key ID. Before vehicle delivery, the key IDs of multiple authorized portable devices 20 are recorded in the EEPROM of the collation ECU 10.

Each portable device 20 transmits the response data including its key ID in response to receipt of a request signal including its key ID from the vehicle-cabin-outside antenna 12a or the vehicle-cabin-inside antenna 12b.

The collation ECU 10 performs the vehicle-cabin-outside collation and the vehicle-cabin-inside collation by regarding a specific portable device 20 as a collation target. When the collation ECU 10 determines that the collation target is detected in the vehicle-cabin-outside collation and is not detected in the vehicle-cabin-inside collation, the collation ECU 10 executes a process of performing the smart lock control and the smart unlock control in accordance with a smart lock operation and a smart unlock operation of the vehicle door.

When the portable device 20 is left in the vehicle cabin, the radio wave of this portable device 20 may leak out of the vehicle cabin and the smart unlock of the vehicle door may be performed, so that a stranger can enter the vehicle cabin. In order to prevent this situation, the collation ECU 10 of the present embodiment has the following function. To perform the smart lock of the vehicle door, the collation ECU 10 places a portable device 20 inside the vehicle cabin in a disabled state and performs, while excluding the portable device 20 in the disabled state, the vehicle-cabin-inside collation of a portable device located inside the vehicle cabin. In accordance with a collation result of the vehicle-cabin-inside collation, the collation ECU 10 performs the smart lock of the vehicle door. The collation ECU 10 has a state determination table, in which the enabled state or the disabled states of all of the authorized portable devices are registered. By using this state determination table, the collation ECU 10 manages whether each portable device 20 is in the enabled state or the disabled state.

Moreover, in order to prevent forgetting of lock of the vehicle door, the collation ECU 10 of the present embodiment further has the following auto-lock function. After the smart unlock of the vehicle door is performed, the auto-lock function automatically locks the vehicle door upon elapse of a predetermined period (e.g., 30 seconds) if opening and closing of the vehicle door have not been detected during the predetermined period.

Figure 3:
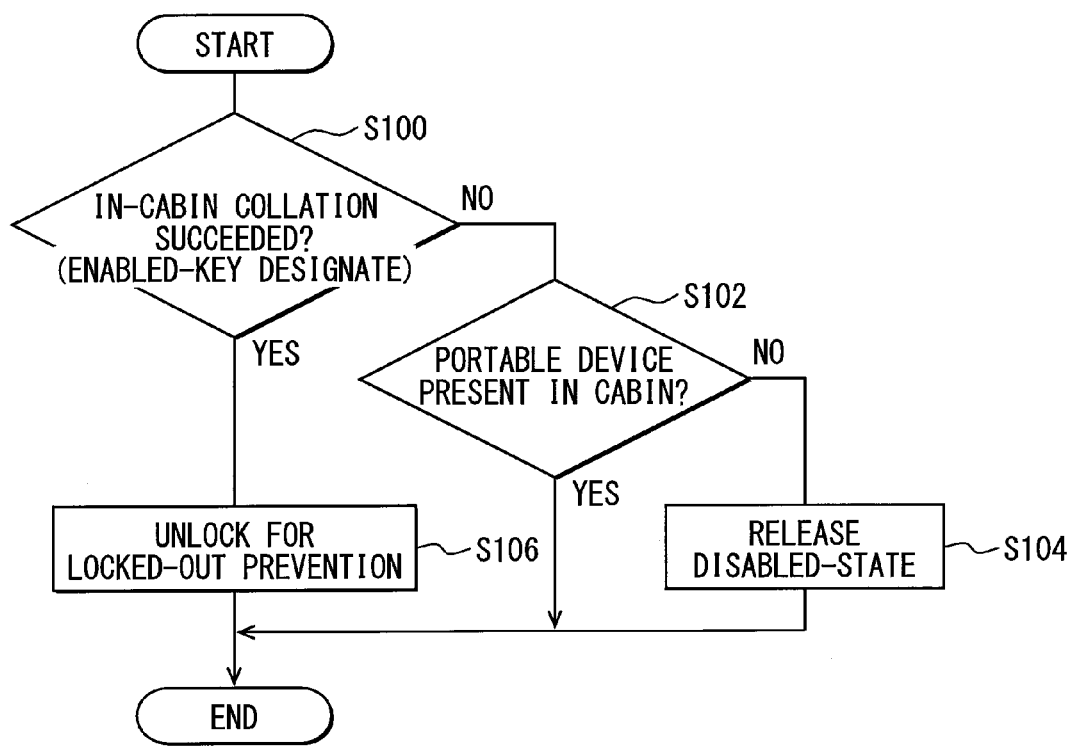
FIG. 3 is a flowchart of a collation ECU when lock of a vehicle door by an auto-lock function is carried out.

FIG. 3 is a flowchart illustrating a process performed by the collation ECU 10 when the lock of the vehicle door by the auto-lock function is performed. When the open state of the vehicle door has not been detected during a predetermined period since the smart unlock of the vehicle door was performed, the vehicle door is automatically locked by the smart lock, and thereafter, the collation ECU 10 performs the process illustrated in FIG. 3. Specifically, based on a signal inputted from the door courtesy switch 14, it is determined whether or not the vehicle door has become the open state during the predetermined period from the smart unlock of the vehicle door. When it is determined that the vehicle door has not become the open state during the predetermined period, the vehicle door is automatically locked by the smart lock, and thereafter, the collation ECU 10 performs the process illustrated in FIG. 3.

first, an enabled key is designated and the vehicle-cabin-inside collation is performed (S100). Specifically, the portable device 20 that is in the enabled state is specified by referencing the state determination table. The vehicle-cabin-inside collation is performed while the portable device 20 in the disabled state is being excluded from the vehicle-cabin-inside collation.

When the portable device 20 in the disabled state is not present inside the vehicle cabin and the vehicle-cabin-inside collation excluding the portable device 20 in the disabled state is unsuccessful, the determination "NO" is made at S100. Next, it is determined whether or not an authorized portable device is present inside the vehicle cabin (S102). Specifically, the key IDs of all of the authorized portable devices 20 are acquired, and it is determined whether or not at least one authorized portable device 20 is present inside the vehicle cabin.

In the above, when there is no authorized portable device 20 in the vehicle cabin, the disabled states of the all of the authorized portable devices 20 are released (S104). Specifically, all of the authorized portable devices 20 registered in the state determination table are placed in the enabled state. In this way, when there is no authorized portable device 20 in the vehicle cabin, it can be determined that all of the portable devices 20 have been carried to the outside of the vehicle cabin. Thus, the disabled states of all of the authorized portable devices 20 are released.

When a portable device 20 in the enabled state is absent in the vehicle cabin and an authorized portable device 20 is present inside the vehicle cabin, that is, when the portable device 20 in the disabled state is present inside the vehicle cabin, the determination at S100 results in NO and the determination at S102 results in YES. In this case, this process is ended with the portable device 20 in the vehicle cabin being maintained in the disabled state. In this way, when the portable device 20 in the enabled state is absent in the vehicle cabin and the authorized portable device 20 is present inside the vehicle cabin, it can be determined that there has been no movement of the portable device 20 from the inside of the vehicle cabin to the outside of the vehicle cabin. Thus, the disabled state of the portable device 20 in the vehicle cabin is maintained.

When the portable device 20 in the enabled state is present inside the vehicle cabin, the determination at S100 results in YES. In this case, the unlock of the vehicle door is performed (S106) to prevent the lockout, which is the locking with the portable device being left in the vehicle cabin. Specifically, the unlock of the vehicle door is performed without changing the portable device in the enabled state present inside the vehicle cabin into the disabled state, so that the lockout, which is the locking with portable device being left in the vehicle cabin, is prevented. In this way, when the portable device 20 in the enabled state is present inside the vehicle cabin, it can be determined that the portable device 20 in the enabled state has been carried to the inside of the vehicle cabin. Thus, without changing the portable device in the enabled state present inside the vehicle cabin into the disabled state, the unlock of the vehicle door is prevented.

Next, the changes in position and state of the portable device "A" and the portable device "B" for the vehicle are explained with reference to FIG. 4. As shown in "initial state" of FIG. 4, it is assumed in the initial state that the portable device "A" in the disabled state is present in the inside of the vehicle cabin and the portable device "B" in the enabled state is present in the outside of the vehicle cabin.

After the smart unlock of the vehicle door is performed, the portable device "A" in the vehicle cabin may move to the outside of the vehicle cabin as shown in FIG. 4 from "initial state" to "all keys move out of cabin". In this case, even when the lock of the vehicle door by the auto lock function is performed due to a failure of the door courtesy switch 14 and non-detection of the open state of the vehicle door during a predetermined period, the disabled states of all of the portable devices 20 are released at S104. Therefore, it is possible to prevent the following situation, in which the portable device 20 moving from the inside of the vehicle cabin to the outside of the vehicle cabin becomes unable to perform the smart unlock of the vehicle door when the door courtesy switch 14 fails.

Moreover, after the smart unlock of the vehicle door is performed, the portable device "B" outside the vehicle cabin may move to the inside of the vehicle cabin as shown in FIG. 4 from "initial state" to "outside key moves into cabin". In this case, even when the lock of the vehicle door by the auto lock function is performed due to a failure of the door courtesy switch 14 and non-detection of the open state of the vehicle door during a predetermined period, the unlock of the vehicle door is performed without changing the portable device 20 in the enabled state present inside the vehicle cabin into the disabled state at S106, so that the lockout, which is the locking with portable device 20 being left in the vehicle cabin, is prevented.

Moreover, after the smart unlock of the vehicle door is performed, the portable device "A" in the vehicle cabin and the portable device "B" outside the vehicle cabin may not move as shown in FIG. 4 from "initial state" to "no key moves". In this case, even when the lock of the vehicle door by the auto lock function is performed due to a failure of the door courtesy switch 14 and non-detection of the open state of the vehicle door during a predetermined period, the disabled state of the portable device 20 inside the vehicle cabin is maintained. Therefore, it is possible to prevent the following situation, in which the smart unlock of the vehicle door is performed because the radio wave of the portable device "A" left in the vehicle cabin leaks out of the vehicle cabin.

According to the above-mentioned configuration, to perform the smart unlock of the vehicle door, the in-vehicle device has the following function. The in-vehicle device places the portable device located inside the vehicle cabin in the disabled state, and performs the vehicle-cabin-outside-collation, which is collation of the portable device located outside the vehicle cabin except the portable device located placed in the disabled state. In accordance with a collation result of the vehicle-cabin-outside-collation, the in-vehicle device perform the smart unlock of the vehicle. The in-vehicle device further has the following auto lock function. When a vehicle door opening detection switch for detecting an open state of the vehicle door detects the open state of the vehicle after the smart unlock of the vehicle is performed, the in-vehicle device keeps the vehicle door unlocked. When the opening or closing of the vehicle door has not been detected during the predetermined period since the smart unlock of the vehicle was performed, the vehicle door is automatically locked. Further, when the lock of the vehicle door by the auto lock function is performed, the in-vehicle device determines whether or not the portable device is present inside the vehicle cabin. When it is determined that there is no portable device in the vehicle cabin, the disabled states of all of the portable devices are released. Therefore, it is possible to prevent the following situation, in which the smart unlock of the vehicle door becomes unavailable when the vehicle door opening detection switch fails.

Moreover, it is determined whether or not the portable device in the enabled state is present inside the vehicle cabin (S100). When it is determined that the portable device in the enabled state is present inside the vehicle cabin, the unlock of the vehicle door is performed. Therefore, it becomes possible to prevent the lockout, which is the locking with portable device being left in the vehicle cabin.

In the above, the unlock of the vehicle door is performed without changing the portable device in the enabled state present inside the vehicle cabin into the disabled state, it becomes possible to prevent all of the portable devices inside the vehicle cabin from being in the disabled state.

Moreover, when it is determined that there is no portable device in the enabled state in the vehicle cabin and that there is a portable device in the vehicle cabin, the disabled state of the portable device present inside the vehicle cabin is maintained. Therefore, it becomes possible to prevent the following situation, in which the radio wave of the portable device left in the vehicle cabin leaks out of the vehicle cabin and a stranger becomes able to enter the vehicle cabin.

Embodiments of the present disclosure are not limited to the above-illustrated embodiments and can have various forms.

For example, in the above-illustrated embodiment, when the lock of the vehicle door by the auto lock function is performed, it is determined whether or not the portable device is present inside the vehicle cabin. When it is determined that the no portable device is present inside the vehicle cabin, the disabled states of all of the portable devices are released. Alternatively, timing of determining whether or not the portable device is present inside the vehicle cabin may be, for example, just before the lock of the vehicle door by the auto lock function is performed.

Furthermore, in the above-illustrated embodiment, at S106, the unlock of the vehicle door is performed without changing the portable device 20 in the enabled state present inside the vehicle cabin into the disabled state, so that the lockout, which is the locking with portable device being left in the vehicle cabin, is prevented. Alternatively, the portable device 20 in the enabled state present inside the vehicle cabin may be changed into the disabled state.

In the above embodiments, S102 corresponds to an example of vehicle-cabin-inside portable determination section (vehicle-cabin-inside portable determination means). S104 corresponds to an example of disabled state release section (disabled state release means). S100 corresponds to an example of enabled state portable determination section (enabled state portable determination means). S106 corresponds to an example of portable lockout prevention section (portable lockout prevention means).

According to the present disclosure, a keyless entry system can be provided in various forms.

For example, a keyless entry system comprising a plurality of portable devices (20) and an in-vehicle device (1) can be provided, wherein the in-vehicle device (1) controls smart lock and smart unlock of a vehicle door and includes an vehicle-cabin-inside portable determination section (S102) and a disabled state release section (S104). The in-vehicle device (1) has the following function; when the smart unlock of the vehicle door is to be performed, the in-vehicle device (1) performs a vehicle-cabin-outside collation, which is collation of a portable device (20) located outside a vehicle cabin while excluding a portable device (20) in a disabled state, wherein the portable device (20) located inside the vehicle cabin is placed in the disabled state. In accordance with a result of the vehicle-cabin-outside collation, the in-vehicle device (1) performs the smart unlock of the vehicle door. The in-vehicle device (1) further has the following auto-lock function; after performing the smart unlock of the vehicle door, the in-vehicle device (1) keeps the vehicle door unlocked when an open state of the vehicle door is detected with a vehicle door open detection switch and automatically locks the vehicle door upon elapse of a predetermined period when opening and closing of the vehicle door have not been detected during the predetermined period. When locking the vehicle door by the auto-lock function, the vehicle-cabin-inside portable determination section (S102) determines whether or not there is the portable device (20) located inside the vehicle cabin. When the vehicle-cabin-inside portable determination section (S102) determines that there is no portable device (20) located inside the vehicle cabin, the disabled state release section (S104) releases the disabled states of all of the portable devices (20).

According to the above configuration, when the lock of the vehicle door by the auto lock function is performed, it is determined whether or not there is a portable device inside the vehicle cabin. When it is determined that there is no portable device inside the vehicle cabin, the disabled-states of all of the portable devices are released. Therefore, it becomes possible to prevent the following situation, in which the smart unlock of the vehicle door is unavailable when the vehicle door opening detection switch fails.

The keyless entry system may further comprises an enabled state portable determination section (S100) and a portable lock-out prevention section (S106). The enabled state portable determination section (S100) determines whether or not the portable device (20) in an enabled state is present inside the vehicle cabin. When the enabled state portable determination section (S100) that determines the portable device (20) in the enabled state is present inside the vehicle cabin, the portable lock-out prevention section (S106) unlocks the vehicle door to prevent lockout for the portable device (20). The portable lock-out prevention section (S106) may perform the smart unlock of the vehicle door without changing the enabled state of the portable device (20) inside the vehicle cabin into the disabled state.

According to this configuration, because the unlock of the vehicle door is performed without changing the portable device in the enabled state present inside the vehicle cabin into the disabled state, it is possible to prevent all of the portable device inside the vehicle cabin from being in the disabled state.

When the enabled state portable determination section (S100) determines that the portable device (20) in the enabled state is not present inside the vehicle cabin and the in-cabin portable determination section (S102) determines that there is the portable device (20) inside the vehicle cabin, the disabled state of the portable device (20) inside the vehicle cabin may be maintained.

According to this configuration, it is possible to prevent the following situation, in which the radio wave of the portable device left in the vehicle cabin leads out of the vehicle cabin and the smart unlock of the vehicle door is performed.

The embodiments, the configurations, and the aspects according to the present disclosure have been illustrated in the above. However, embodiments, configurations, and aspects according to the present disclosure are not limited to respective embodiments, respective configurations, and respective aspects described above. For example, embodiments, configurations, and aspects obtained by combining suitably the technical parts disclosed in the different embodiments, configurations, and aspects are also included in the technical scope of embodiments, configurations, and aspects according to the present disclosure.

What is claimed is:

1. A keyless entry system comprising:
    a plurality of portable devices; and
    an in-vehicle device that controls smart lock and smart unlock of a vehicle door,
    wherein;
    the in-vehicle device has:
    a function that,
        when the smart unlock of the vehicle door is to be performed, performs a vehicle-cabin-outside collation, which is collation of a portable device located outside a vehicle cabin while excluding a portable device in a disabled state located inside the vehicle cabin, and
        performs the smart unlock of the vehicle door in accordance with a result of the vehicle-cabin-outside collation; and
    an auto-lock function that, after performing the smart unlock of the vehicle door,
        keeps the vehicle door unlocked when an open state of the vehicle door is detected with a vehicle door open detection switch and
        automatically locks the vehicle door upon elapse of a predetermined period when opening and closing of the vehicle door have not been detected during the predetermined period,
    the keyless entry system further comprising:
    an vehicle-cabin-inside portable determination section that, when locking the vehicle door by the auto-lock function, determines whether or not there is the portable device located inside the vehicle cabin; and
    a disabled state release section that releases the disabled states of all of the portable devices when the vehicle-cabin-inside portable determination section determines that there is no portable device located inside the vehicle cabin.

2. The keyless entry system according to claim 1, further comprising:
    an enabled state portable determination section that determines whether or not the portable device in an enabled state is present inside the vehicle cabin; and
    a portable lock-out prevention section that, when the enabled state portable determination section that determines the portable device in the enabled state is present inside the vehicle cabin, unlocks the vehicle door to prevent lockout for the portable device.

3. The keyless entry system according to claim 2, wherein:
    the portable lock-out prevention section performs the smart unlock of the vehicle door without changing the enabled state of the portable device inside the vehicle cabin into the disabled state.

4. The keyless entry system according to claim 2, wherein:
    when the enabled state portable determination section determines that the portable device in the enabled state is not present inside the vehicle cabin and the in-cabin portable determination section determines that there is the portable device inside the vehicle cabin, the disabled state of the portable device inside the vehicle cabin is maintained.

* * * * *